E. JFANGER.
TOOL FOR CUTTING SCREW THREADS IN WORK PIECES.
APPLICATION FILED JUNE 7, 1918.

1,408,205.

Patented Feb. 28, 1922.

Inventor:-
Eduard Jfanger.
By: B. Singer
Atty

UNITED STATES PATENT OFFICE.

EDUARD JFANGER, OF USTER, SWITZERLAND.

TOOL FOR CUTTING SCREW THREADS IN WORK PIECES.

1,408,205.  Specification of Letters Patent.  Patented Feb. 28, 1922.

Application filed June 7, 1918. Serial No. 238,692.

*To all whom it may concern:*

Be it known that I, EDUARD JFANGER, engineer, a citizen of the Swiss Confederation, residing at Uster, Canton Zurich, Switzerland, have invented new and useful Improvements in a Tool for Cutting Screw Threads in Work Pieces, of which the following is a specification.

The present invention relates to a new and improved tool for cutting screw threads in work pieces of any kind held and rotated by a chuck in the well known manner in relation to the screw-cutting tool which is fed in linear direction against the work.

The primary object of this invention is to provide a screw-cutting tool which works in the manner of a backed-off cutter. I attain this object by giving to the cutting thread of the tool a flank which forms part of a helix and another flank which forms part of a helix of a lower pitch than the first named flank. The flanks of the thread enclose the same angle at each point of the thread but the dimensions decrease gradually from the cutting edge away in such a manner that the thread works in the manner of a backed-off cutter. The new screw threading tool is easily made and may be quickly and exactly sharpened without altering the cross-section of the thread.

In the drawing a form of the tool for cutting screw-threads is shown by way of an example.

Figure 1:
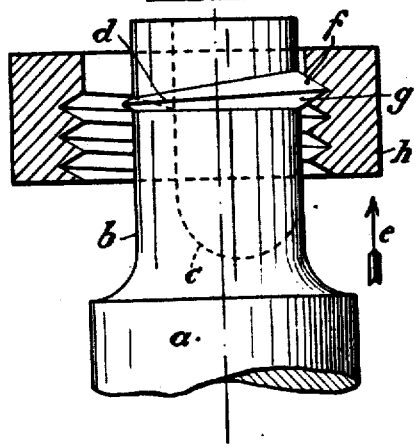
Figure 1 is a side elevation of the tool showing the same in operation.
Figure 2:
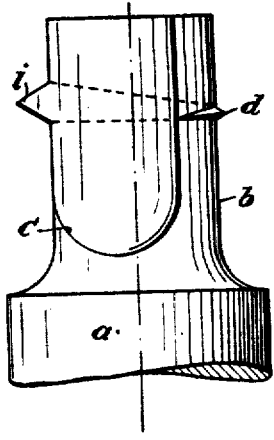
Figure 2 is a view similar to Figure 1, but showing the tool in a different position.
Figure 3:
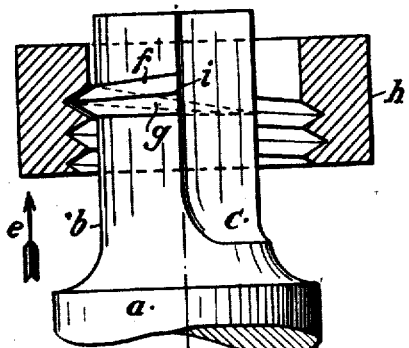
Figure 3 is a front elevation of the tool engaged in cutting a thread.
Figure 4:
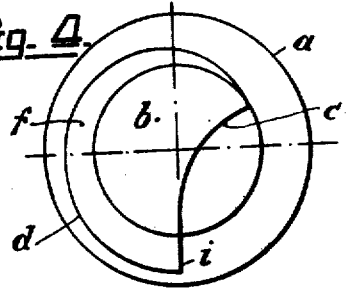
Figure 4 is a plan view of the tool.

The new tool $a$ comprises a shank of suitable shape and dimension by means of which the tool may be fastened in a tool carrier for instance in the slide rest of a lathe. The front end $b$ of the tool is provided with a notch $c$ extending over one third to one half of the circumference of the end piece $b$. On the piece $b$, a thread $d$ is provided the cross-section of which corresponds to the cross-section of the thread to be cut in a nut $h$. The thread $d$ has two flanks $f$ and $g$. The flank $f$ forms part of a helice and the flank $g$ forms part of a truncated cone the apex of which being in the axis of the tool $a$. The pitch of the helice corresponds approximately to the pitch of the thread to be cut in the nut $h$. The angle enclosed by the flanks $f$ and $g$ is exactly the same along the entire thread $d$ but the size of the cross-section of the thread decreases gradually from the cutting edge $i$ to the other end of thread.

The nut $h$ which is held by a chuck is rotated. The tool $a$ which is fastened for instance in the slide rest of a lathe is advanced in the direction indicated by the arrow $e$, the tool being set in such a manner that the edge $i$ works on the nut $h$, the axis of the tool $a$ is thereby parallel to the axis of rotation of the nut $h$. Taking a cut, the tool $a$ is moved with the face $f$ in advance.

It is apparent that owing to the peculiar shape of the thread $d$ it works like a backed-off cutter, the cutting edge $i$ being only in contact with the nut $h$ all other parts of the thread $d$ move with ample clearance in the thread cut in the work piece $h$.

The tool $a$ may be easily sharpened by enlarging the groove $c$ on the side of the cutting face $i$, the cross-section of the thread $d$ is not altered in any way.

The cross-section of thread $d$ may be square, rectangular, trapezoidal, etc. instead as triangular as shown. The thread $d$ may be arranged on a separate plate which is exchangeably fixed on a tool carrier.

What I claim and wish to secure by Letters Patent is:

A thread cutting tool having a shank provided with a notch in one side and with an inclined thread tooth on said shank and extending continuously therearound from side to side of the notch, one end of said thread tooth forming a cutting face, said thread tooth diminishing in size from said end to the opposite end and having two flanks, one of which forms a helix, the other flank forming part of a truncated cone the apex of which is in the axis of the tool.

In testimony whereof I affix my signature.

EDUARD JFANGER.